(12) United States Patent
Grubbs

(10) Patent No.: US 6,659,533 B1
(45) Date of Patent: Dec. 9, 2003

(54) VEHICLE CONVERTIBLE ROOF

(75) Inventor: Todd A. Grubbs, Adrian, MI (US)

(73) Assignee: ASC Incorporated, Southgate, MI (US)

( * ) Notice: Subject to any disclaimer, the term of this patent is extended or adjusted under 35 U.S.C. 154(b) by 0 days.

(21) Appl. No.: 10/237,919

(22) Filed: Sep. 9, 2002

(51) Int. Cl.⁷ ................................................. B60J 7/12
(52) U.S. Cl. ............. 296/107.07; 296/117; 296/107.09; 296/107.16
(58) Field of Search ............................ 296/107.01, 108, 296/109, 116, 117, 107.07, 107.09, 107.16

(56) References Cited

U.S. PATENT DOCUMENTS

| | | | |
|---|---|---|---|
| 2,267,471 A | 12/1941 | Keller | |
| 2,747,923 A | 5/1956 | McLean | |
| 2,836,457 A | 5/1958 | Beerman et al. | |
| 2,957,725 A | 10/1960 | Ford, II et al. | |
| 2,997,337 A | * 8/1961 | Day et al. | 296/107.09 |
| 3,236,557 A | 2/1966 | Podolan | |
| 3,332,169 A | 7/1967 | Lohr et al. | |
| 3,333,362 A | 8/1967 | Kostin et al. | |
| 3,346,297 A | 10/1967 | Colautti et al. | |
| 3,385,629 A | 5/1968 | Podolan | |
| 3,536,354 A | 10/1970 | Ingram | |
| 3,655,238 A | 4/1972 | Stewart | |
| 4,543,747 A | 10/1985 | Kaltz et al. | |
| 4,572,570 A | 2/1986 | Trucco | |
| 4,626,020 A | 12/1986 | Kaltz et al. | |
| 4,711,485 A | * 12/1987 | Maebayashi et al. | 296/108 |
| 4,784,428 A | * 11/1988 | Moy et al. | 296/107.07 |
| 4,852,935 A | 8/1989 | Varner | |
| 5,195,798 A | 3/1993 | Klein et al. | |
| 5,207,474 A | 5/1993 | Licher et al. | |
| 5,267,770 A | 12/1993 | Orth et al. | |
| 5,772,274 A | 6/1998 | Tokarz | |
| 5,829,821 A | 11/1998 | Aydt et al. | |
| 5,938,271 A | 8/1999 | Schuler et al. | |
| 5,988,729 A | 11/1999 | Klein | |
| 6,123,381 A | 9/2000 | Schenk | |
| 6,149,223 A | 11/2000 | Baessler et al. | |
| 6,209,945 B1 | 4/2001 | Aydt et al. | |
| 6,283,532 B1 | 9/2001 | Neubrand | |
| 6,312,041 B1 | * 11/2001 | Queveau et al. | 296/107.17 |
| 6,431,637 B2 | * 8/2002 | Maass | 296/146.14 |
| 2001/0033089 A1 | 10/2001 | Maass | |
| 2002/0005653 A1 | 1/2002 | Heselhaus et al. | |
| 2002/0024230 A1 | 2/2002 | Pfertner et al. | |

FOREIGN PATENT DOCUMENTS

| | | |
|---|---|---|
| DE | 4203228 A1 | 8/1993 |
| FR | 2797817 A1 | 3/2001 |

* cited by examiner

Primary Examiner—Stephen T. Gordon
Assistant Examiner—Patricia L. Engle
(74) Attorney, Agent, or Firm—Harness, Dickey & Pierce, P.L.C.

(57) ABSTRACT

A convertible roof having a backlite that is substantially vertical when the convertible roof is in a raised position is provided. An automatically powered actuator used to actively control retraction of a convertible roof and a backlite frame is provided. Actively controlling a roof bow immediately forward of a backlite frame is provided.

61 Claims, 10 Drawing Sheets

VEHICLE CONVERTIBLE ROOF

BACKGROUND AND SUMMARY OF THE INVENTION

This invention relates generally to roofs for automotive vehicles and, more particularly, to a convertible roof and backlite.

Traditional soft-top convertible roofs for automotive vehicles typically employ four or five roof bows, most of which have an inverted U-shape spanning transversely across the vehicle for supporting a vinyl, canvas or polyester fabric, pliable roof cover. A number one roof bow is mounted to a pair of front roof rails and is typically latched to a stationary front header panel of the automotive vehicle body disposed above the front windshield. A number two bow is typically mounted to a pair of center roof rails which are pivotally connected to the front roof rails. Furthermore, the number three, four and any additional optional roof bows are commonly mounted to a pair of rear roof rails which are pivotally coupled to the center roof rails. The roof cover can also have a hard or rigid portion along with the pliable portion. For example, reference should be made to U.S. Pat. No. 5,429,409 entitled "Convertible Top", which is incorporated by reference herein. Most traditional convertible roofs are stowed in a boot well or stowage compartment that is located aft of a passenger compartment in a vehicle.

Traditional soft-top convertible roofs have a backwindow, known as a backlite, that retracts with the convertible roof into the stowage compartment. Traditionally, these backlites are angled, when raised, to provide a desired appearance to the vehicle and to facilitate folding of the convertible roof. Additionally, traditional soft-top convertible roofs can employ a powered actuator for controlling the folding mechanism that retracts the convertible roof. Typically, the rear portion of the convertible roof which includes the backlite and/or frame surrounding the backlite is passively controlled and rely upon the movement of the flexible cover to position the backlite and/or frame when the convertible roof is transitioned from raised and stowed positions. Furthermore, second and subsequent roof bows of traditional soft-top convertible roofs are also typically passively controlled and rely upon the movement of the flexible cover to position the roof bows when the convertible roof is transitioned from raised and stowed positions. When a rigid frame is used to retain a backlite, the passively controlled roof bows may interfere with the rigid frame and/or backlite when the convertible roof is retracted to its stowed position. This potential is most pronounced in a roof bow immediately forward of the frame.

In accordance with the present invention, a convertible roof is provided which includes a backlite that is substantially vertical when the convertible roof is in a raised position. Another aspect of the present invention retains a portion of a backlite within a frame that retracts with the folding of a convertible roof. A further and optional aspect of the present invention employs a backlite which can be independently retracted such that a backlite frame does not retain the backlite when the backlite is retracted.

In another aspect of the present invention, an automatically powered actuator is used to actively control the retraction of a convertible roof and a backlite frame. In yet another aspect of the present invention, a roof bow immediately forward of a backlite frame and/or backlite is actively controlled. Still another aspect of the present invention discloses a unique and novel way to control the folding of a convertible roof mechanism such that a backlite frame (and backlite when not independently retractable) retracts first, is stowed below a folding mechanism, and has a linkage mechanism that is driven by an automatically powered actuator with the rest of the folding mechanism. Finally, a vehicle having fore and aft seating areas, a storage area, and a convertible roof which has substantially nothing above a fore-aft belt line of the vehicle, rearward of the A-pillar when the convertible roof is in the stowed position, is also disclosed in yet a further aspect of the present invention.

Accordingly, the present invention overcomes the above shortcomings of traditional convertible roofs. A substantially vertical backlite is provided in conjunction with a convertible roof to provide a vehicle with a "station wagon" or "sport utility vehicle" look. To provide such a look, a convertible roof extends substantially to the rear of a vehicle with a backlite and rear of the convertible roof being substantially vertical. Optionally, a backlite can be retracted independently of a convertible roof to allow access to a rear of a vehicle without retracting the convertible roof. When a backlite is substantially vertical or a substantially rigid backlite frame is used to retain the backlite, a controlled retraction of the backlite and/or backlite frame into a stowage compartment is provided to minimize a required stowage area and provide a more compact folded convertible roof. When actively controlling a backlite and/or backlite frame, an automatically powered actuator is used to retract the backlite and/or backlite frame along with a convertible roof in order to simplify the convertible roof and minimize cost. Accurately controlling a roof bow immediately forward of a backlite frame to prevent this roof bow from interfering with the backlite frame and/or backlite when the convertible roof is retracted to a stowed position is also provided.

Along with the above features and aspects of the convertible roof according to the present invention, additional objects, advantages and features of the present invention will become apparent from the following description and appended claims, taken in conjunction with the accompanying drawings. It should be understood that the detailed description and specific examples, while indicating the preferred embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT

The following description of the preferred embodiment is merely exemplary in nature and is in no way intended to limit the invention, its application, or uses.

Figure 1A:
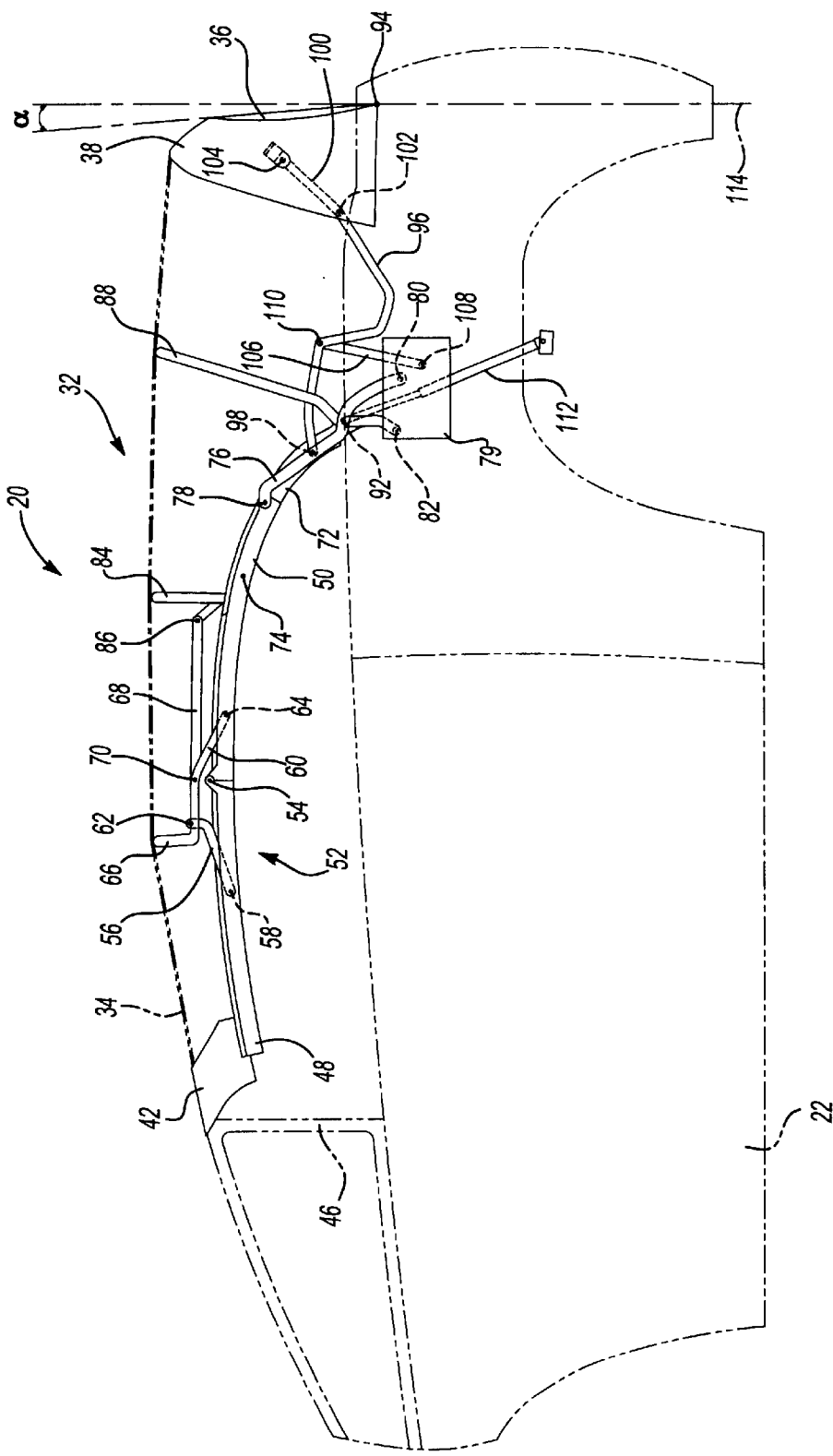
FIG. 1A is a side elevation view showing the preferred embodiment of a vehicle with a convertible roof in a raised operative position in accordance with the principles of the present invention.
Figure 1B:
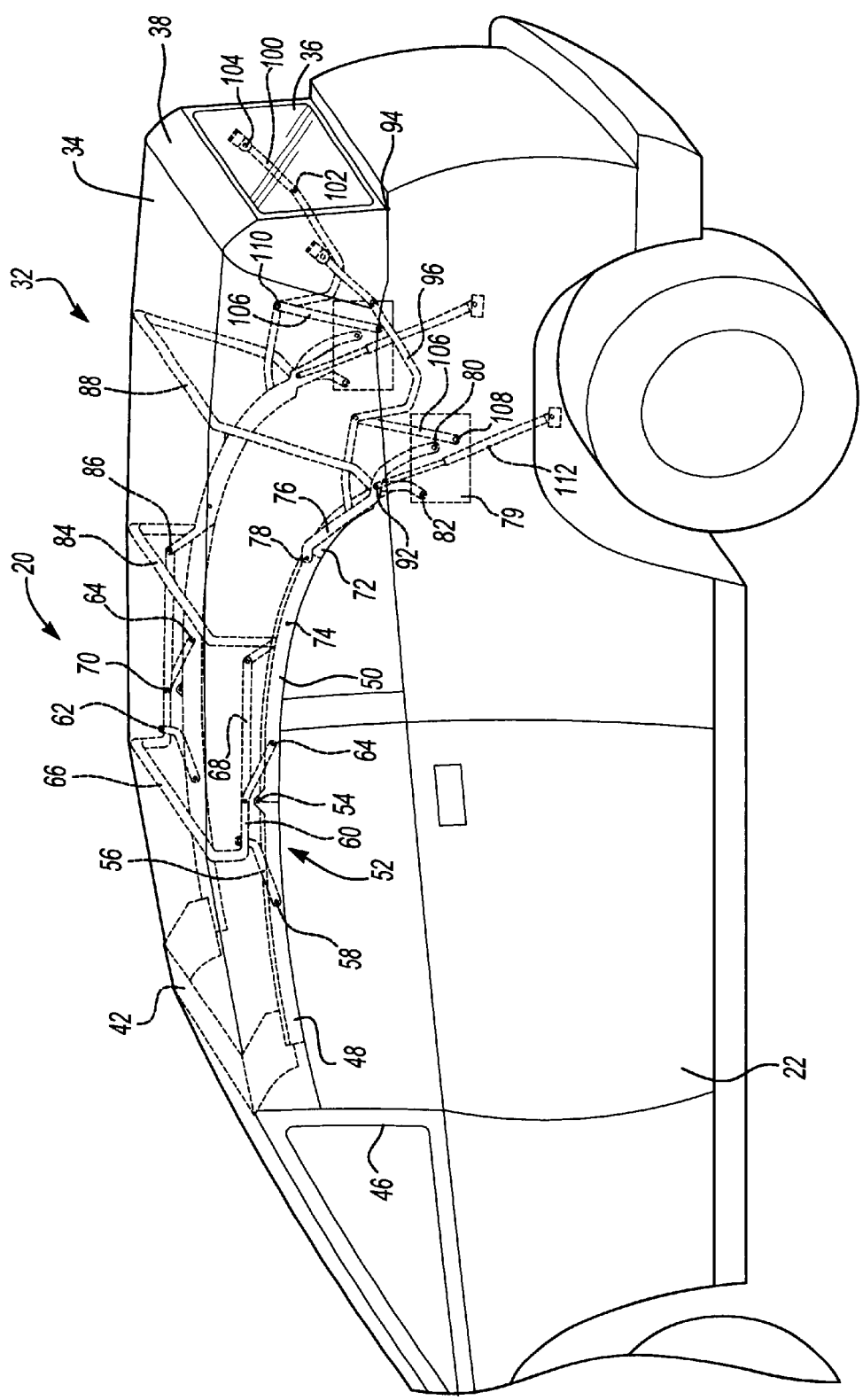
FIG. 1B is a perspective view of the rear of the vehicle of FIG. 1A.
Figure 2A:
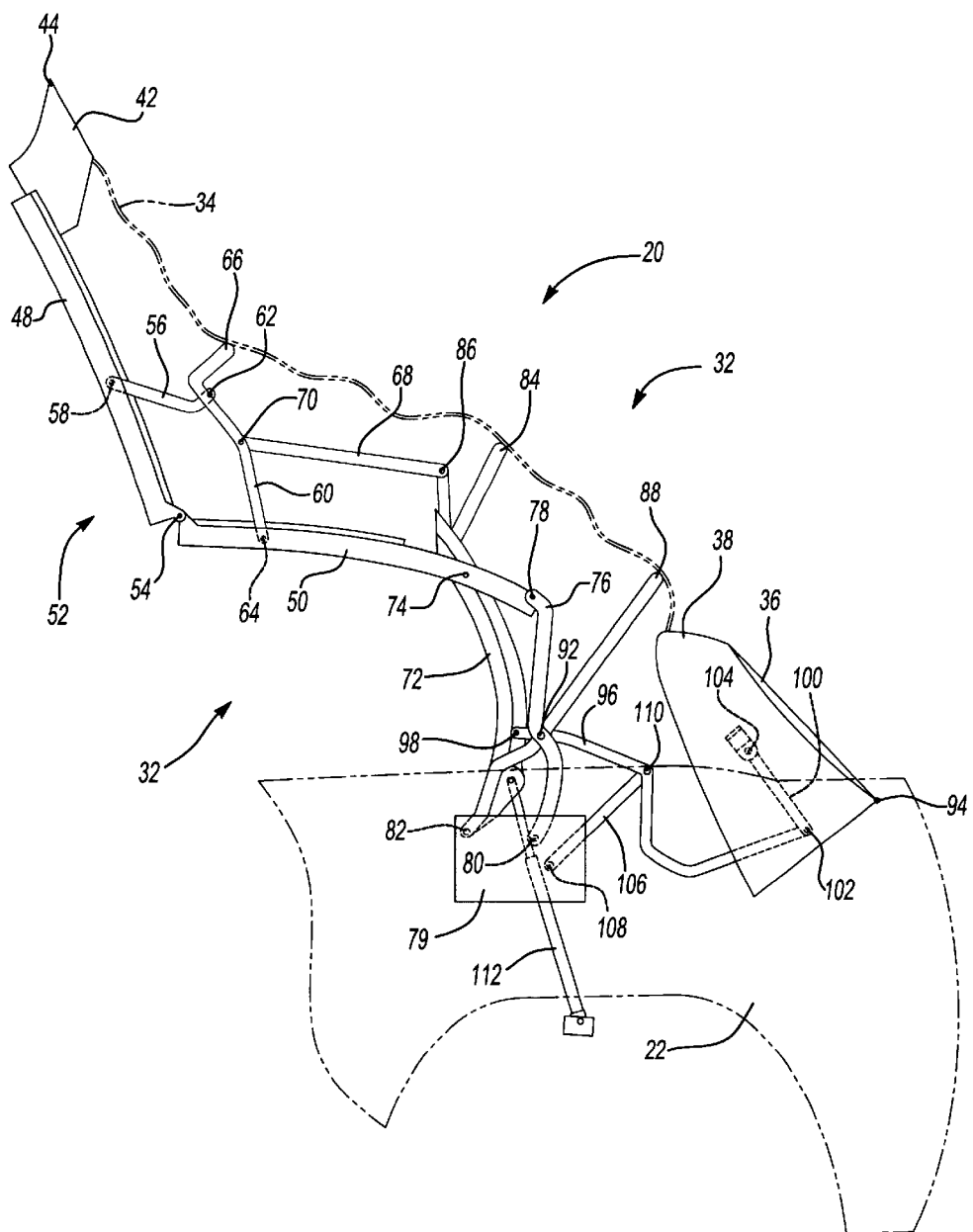
FIGS. 2A and 2B are side elevation views of the vehicle of FIG. 1A showing the convertible roof folding mechanism in accordance with the principles of the present invention in different midpoint positions between the raised and stowed positions.
Figure 2B:
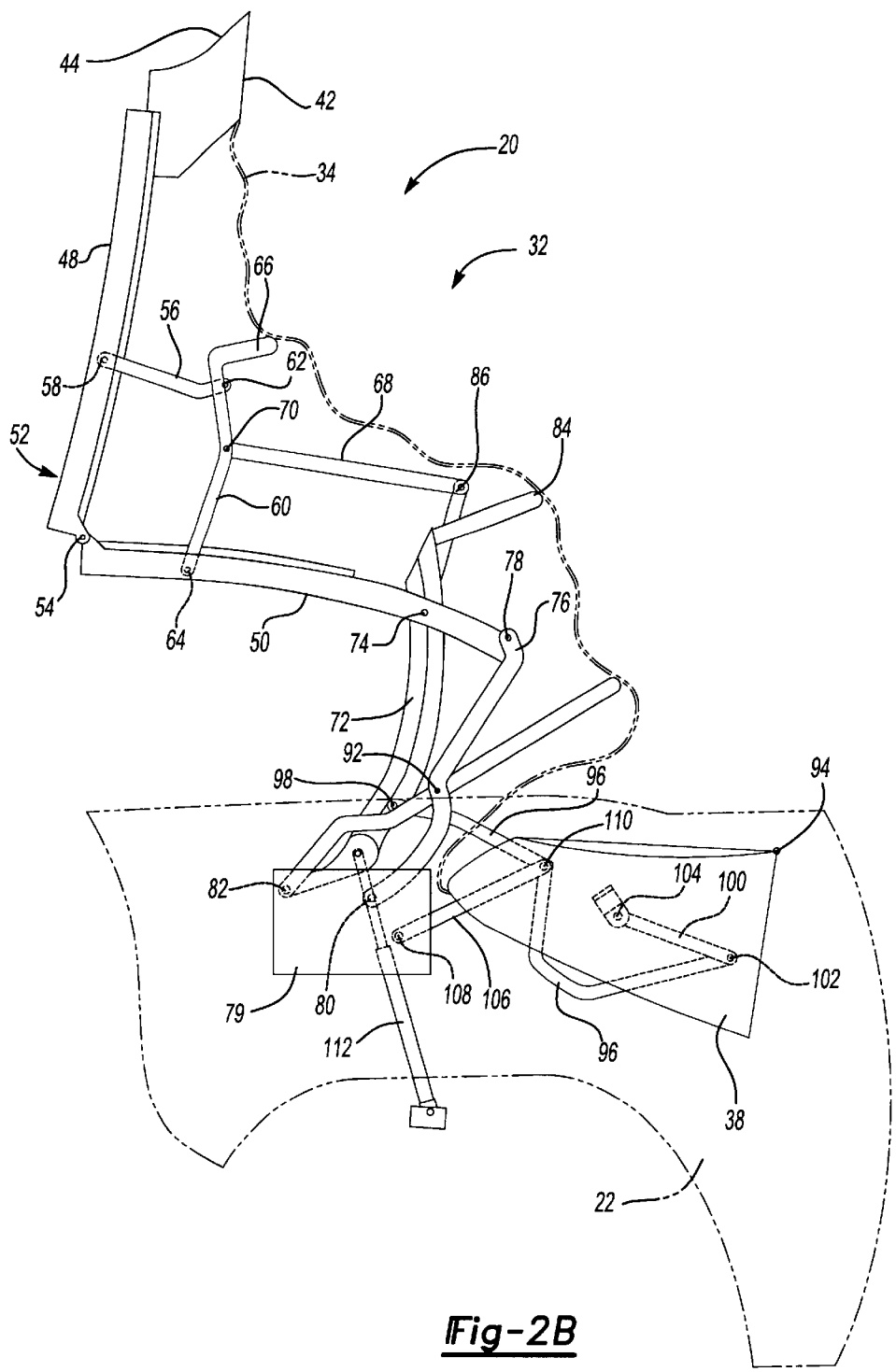
Figure 3A:
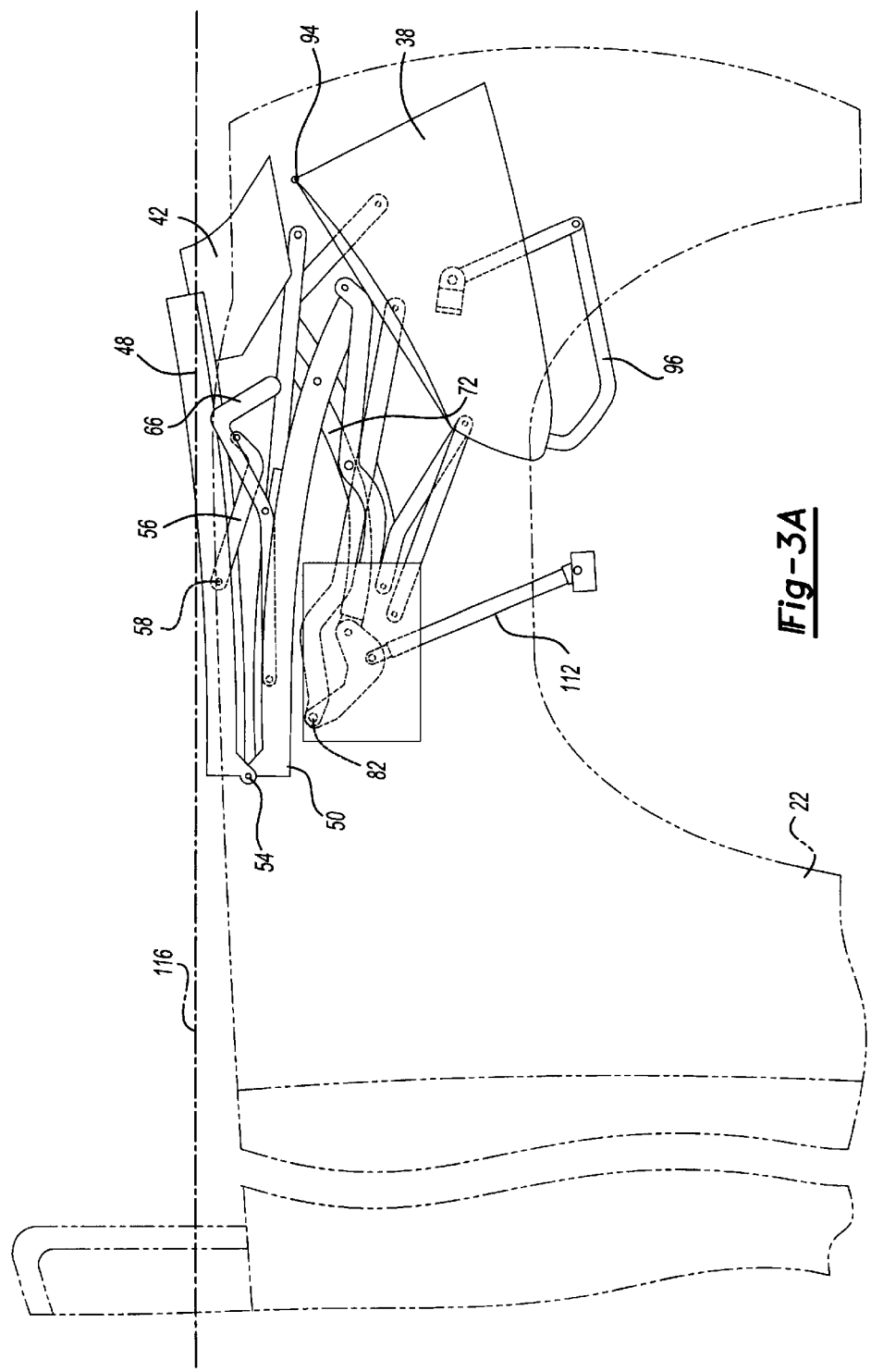
FIG. 3A is a side elevation view of the vehicle of FIG. 1A showing the convertible roof folding mechanism in accordance with the principle of the present invention in a stowed position.
Figure 3B:
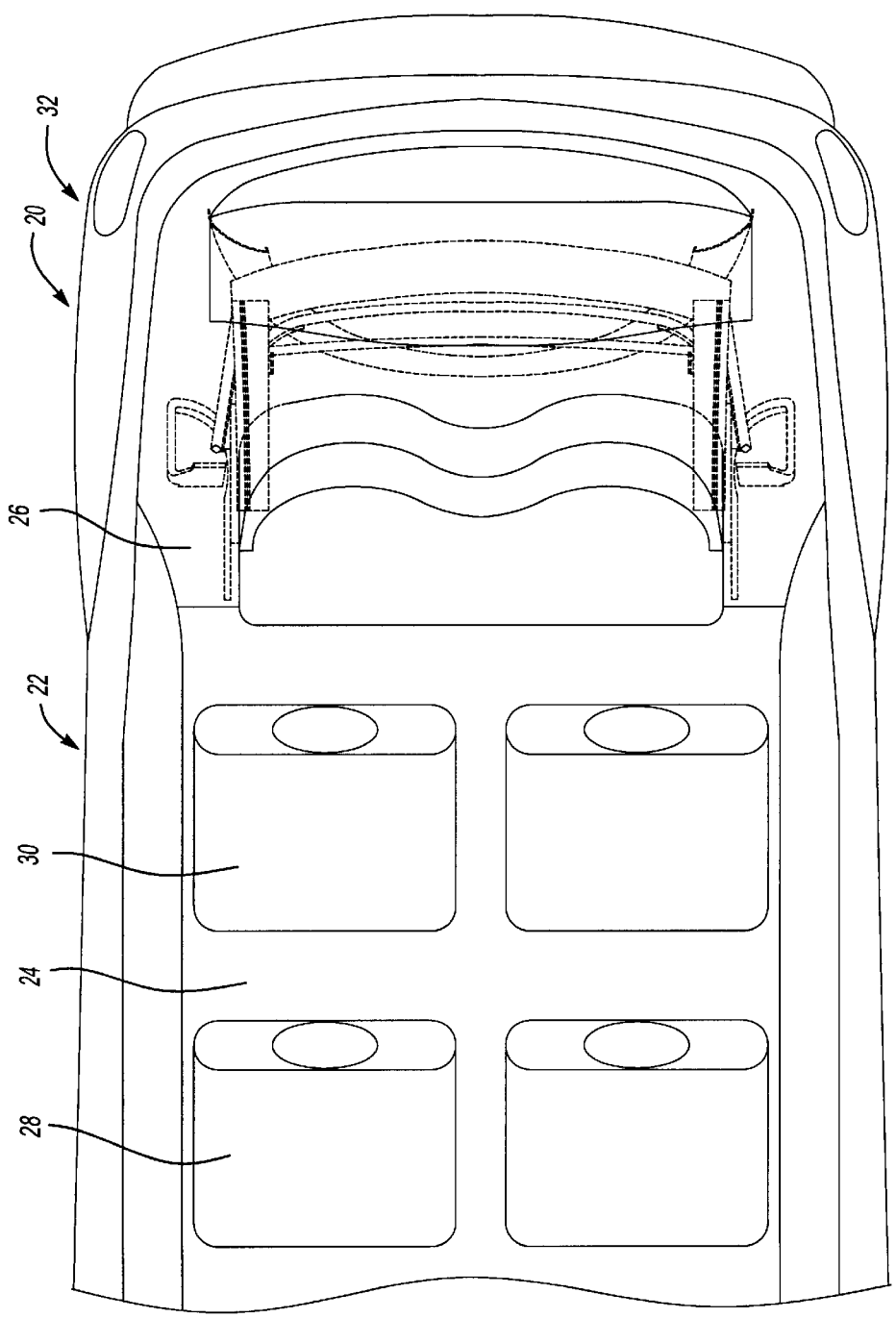
FIG. 3B is a top elevation view of the vehicle of FIG. 3A.

FIGS. 1–3 show a first preferred embodiment of a convertible roof 20 of the present invention while FIGS. 4A—D show an alternate embodiment of a convertible roof 20 of the present invention. Convertible roof 20 is employed on an automotive vehicle 22 having a passenger compartment 24 and a storage compartment 26 located aft of passenger compartment 24. Passenger compartment 24 has first and second seating areas 28 and 30. Second seating area 30 is positioned rearward or aft of first seating area 28 and forward or fore of storage compartment 26. Each of the seating areas 28 and 30 contain a soft seating surface on which an occupant of vehicle 22 can sit. Seating areas 28 and 30 and storage compartment 26 are arranged such that in the interior of vehicle 22, storage compartment 26 is accessible from seating areas 28 and 30.

Figure 4A:
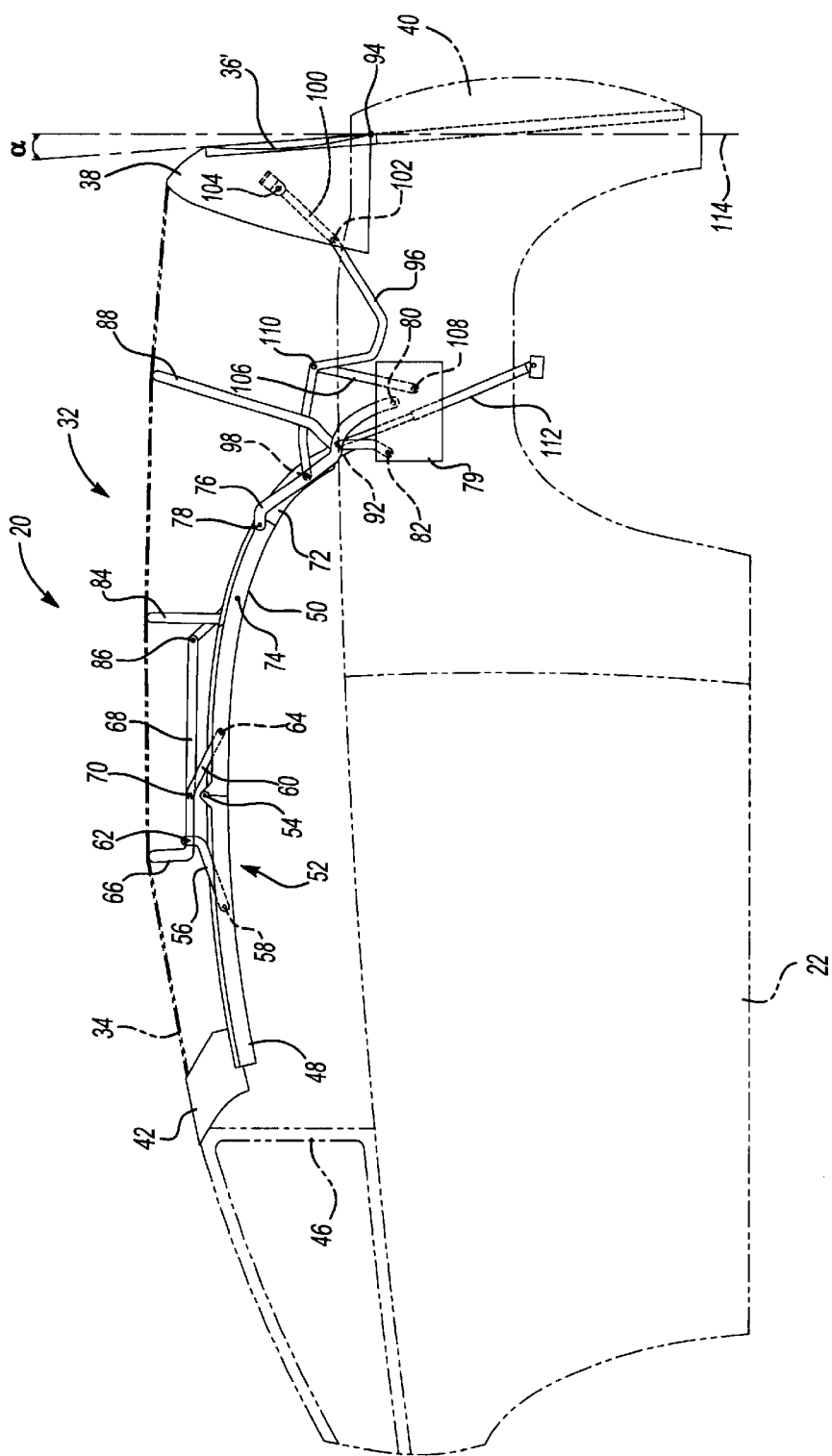
FIGS. 4A and 4B are side elevation views showing an alternate embodiment of a vehicle having a convertible roof in accordance with the principles of the present invention with an independently retractable backlite in an extended position and retracted position respectively.
Figure 4B:
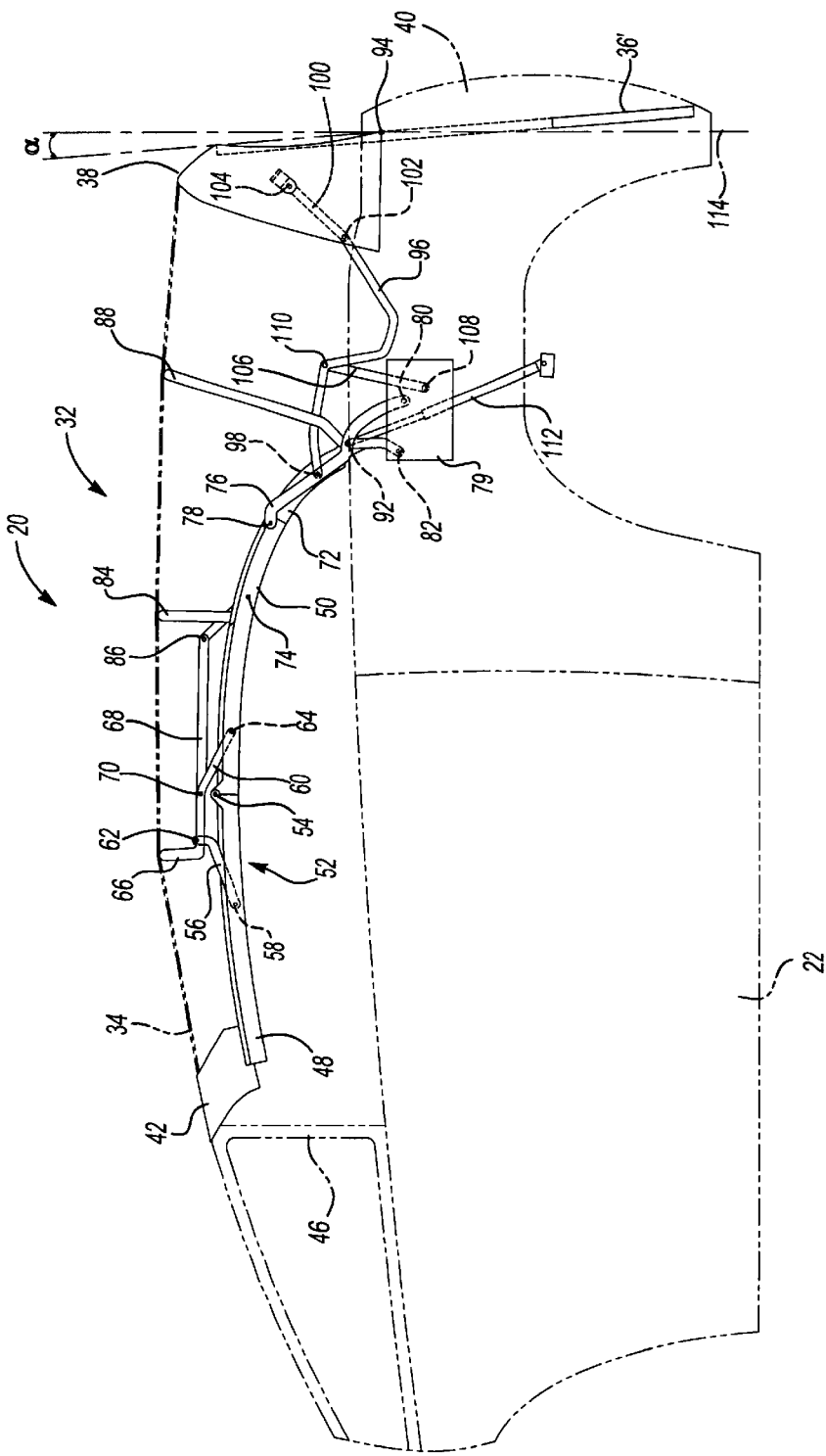
Figure 4C:
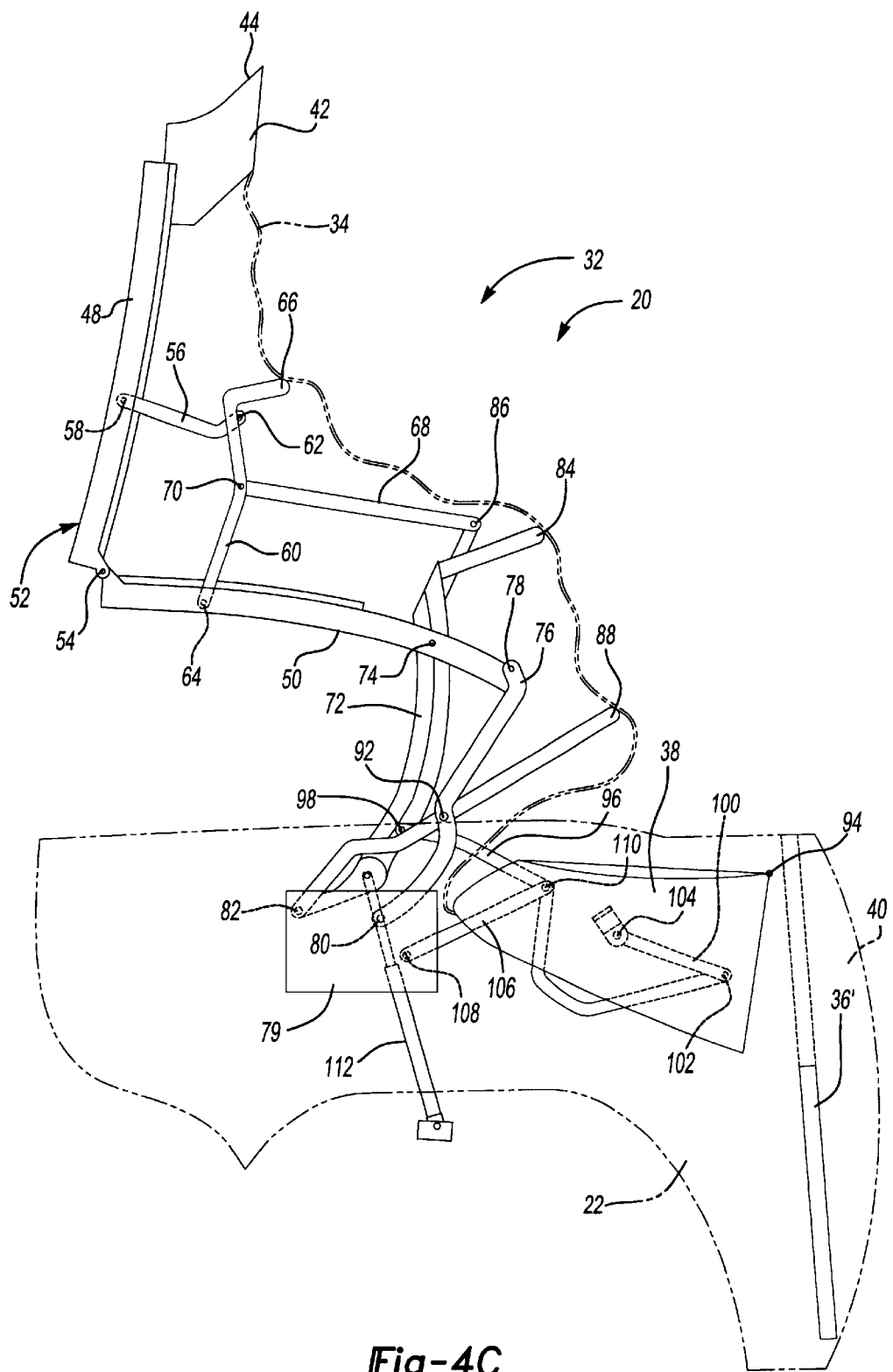
FIG. 4C is a side elevation view of the vehicle of FIG. 4A showing the convertible roof folding mechanism in accordance with the principles of the present invention in a midpoint position between the raised and stowed positions and the backlite in a retracted position.

Convertible roof 20 is of the type utilizing a folding or top stack mechanism 32 that partially supports a roof cover 34 and is operable between a fully raised position, as shown in FIGS. 1A and 4A, and a fully stowed position, as shown in FIG. 3A and 4C. Roof cover 34 is made from a pliable material, such as vinyl, canvas or a polyester fabric. If desired, roof cover 34 can also include a hard portion (not shown) depending upon the desired look and appearance of the convertible roof 20.

Convertible roof 20 also includes a backlite 36 that is retained within a frame 38 of folding mechanism 32. Backlite 36, as shown in FIGS. 1–3, can be integral to frame 38 and move as a unitary piece with frame 38 when folding mechanism 32 is moved between the raised and stowed positions. In an alternate embodiment, as shown in FIGS. 4A–4C, backlite 36' is retractable independently of folding mechanism 32. That is, backlite 36' can retract into a tailgate or rear stowage compartment 40 independently and separately from folding mechanism 32 and frame 38, as described in more detail below.

Referring to FIGS. 1–3, convertible roof 20 and folding mechanism 32 are shown symmetrical about a longitudinal, fore-and-aft centerline (not shown) of vehicle 22. Folding mechanism 32 includes right and left roof linkages on the respective right and left sides of vehicle 22. For brevity, only the left side of folding mechanism 32 is shown and discussed, however, it should be understood that right side linkages are also provided as part of folding mechanism 32 and are mirrored images of the left side. Also, when using the terms "fore" and "aft", "front" and "back", and "forward" and "rearward" in describing components of folding mechanism 32, such reference refers to the orientation of the components when folding mechanism 32 is in the fully raised position.

Folding mechanism 32 includes a first roof bow 42 that extends transversely across vehicle 22 and has a front edge 44 that is latched to a stationary front header panel of vehicle 22 disposed above the front windshield when in the fully raised position, as shown in FIG. 1A. Vehicle 22 has an A-pillar 46 that extends along the front windshield and across which the stationary front header panel of vehicle 22 extends. Cover 34 is attached to first roof bow 42. First roof bow 42 is fixedly connected to a front roof rail 48. Alternatively, first roof bow 42 can be formed integrally with front roof rail 48. For example, first roof bow 42 and front roof rail 48 can be integrally cast from aluminum or a magnesium alloy. Front roof rail 48 is pivotally coupled to a center roof rail 50 by a multi-link hinge assembly (MHA) 52. MHA 52 controls rotation of front roof rail 48 relative to center roof rail 50.

MHA 52 includes a pivot connection 54 between a back end portion of front roof rail 48 and a front end portion of center roof rail 50. One end of a first link 56 is pivotally connected to an intermediate back end portion of front roof rail 48 at pivot 58 while an opposite end is pivotally connected to an end of a second link 60 at pivot 62. An opposite end of second link 62 is pivotally connected to the front end portion of center roof rail 50 at pivot 64. Thus, MHA 52 is a 4-bar linkage that includes front roof rail 48, first link 56, second link 60, and center roof rail 50. A second roof bow 66 is fixedly attached to second link 60 adjacent pivot 62. Alternatively, second roof bow 66 can be formed integrally with second link 60 in a similar manner as described above with forming first roof bow 42 integrally with front roof rail 48. The fixed connection between second roof bow 66 and second link 60 causes second roof bow 66 to be actively controlled by second link 60. Movement of MHA 52 is controlled by a first control link 68 which is pivotally coupled to MHA 52. As can be seen, a front end portion of first control link 68 is pivotally connected to second link 60 at pivot 70.

An intermediate back end portion of center roof rail 50 is pivotally connected to an intermediate front end portion of a rear roof rail 72 at pivot 74, while a back end portion of center roof rail 50 is pivotally connected to an end of a balance link 76 at pivot 78. An opposite end of balance link 76 is pivotally connected to a fixed plate 79 at pivot 80. Fixed plate 79 is rigidly attached to vehicle 22 so that fixed plate 79 acts as a stationary extension of vehicle 22. A back end portion of rear roof rail 72 is pivotally connected to fixed plate 79 at pivot 82. The pivotable connections between center roof rail 50, rear roof rail 72, balance link 76, and fixed plate 79 form a 4-bar linkage assembly defined by pivots 74, 78, 80 and 82 that controls the rotation of center roof rail 50 relative to rear roof rail 72 along with controlling the movement of folding mechanism 32, as described in more detail below.

A third roof bow 84 is fixedly connected to a front end portion of rear roof rail 72. Alternatively, third roof bow 84 can be formed integrally with rear roof rail 72 in a similar manner as described above with forming first roof bow 42 integrally with front roof rail 48. Because third roof bow 84 is fixedly connected to rear roof rail 72, movement of third roof bow 84 is actively controlled by movement of rear roof rail 72. Rear roof rail 72 also controls movement of MHA 52 via first control link 68. Specifically, an integral extension of a front end portion of rear roof rail 72 is pivotally connected to an end of first control link 68 at pivot 86. The pivotable connection between first control link 68 and rear roof rail 72, allows rear roof rail 72 to control the movement of front roof rail 48 and second bow 66 via MHA 52.

One end of a fourth roof bow 88 is pivotally connected to fixed plate 79 at pivot 82 along with the back end portion of rear roof rail 72. An intermediate portion of fourth roof bow 88 is pivotally connected to an intermediate portion of balance link 76 at pivot 92. The pivotable connection between fourth roof bow 88 and balance link 76 allows movement of fourth roof bow 88 to be actively controlled by movement of balance link 76. Thus, fourth roof bow 88 is actively controlled when folding mechanism 32 moves between the raised and stowed positions.

A rear lower portion of frame 38 is pivotally connected to vehicle 22 at pivot 94. Pivot 94 allows frame 38 to pivot forwardly when folding mechanism 32 is being moved from the raised to the stowed position. The pivotal movement of frame 38 about pivot 94 is controlled by rear roof rail 72 via a second control link 96. To accomplish this, a first end of second control link 96 is pivotally connected to a back end portion of rear roof rail 72 at pivot 98 while a second end of second control link 96 is pivotally coupled to frame 38 via a third link 100. Specifically, second end of second control link 96 is pivotally connected to a first end of third link 100 at pivot 102 while a second end of third link 100 is pivotally connected to frame 38 at pivot 104. To aide in controlling the pivotal movement of frame 38, one end of a fourth link 106 is pivotally connected to fixed plate 79 at pivot 108 while an opposite end of fourth link 106 is pivotally connected to an intermediate portion of second control link 96 at pivot 110. The pivotable connections between rear roof rail 72, second control link 96, fourth link 106 and fixed plate 79 form a 4-bar linkage defined by pivots 98, 110, 108, and 82. This 4-bar linkage controls the movement of second control link 96 and, thus, rotation of frame 38 about pivot 94 via third link 100. Therefore, movement of rear roof rail 72 controls the movement of frame 38 via second control link 96.

Rear roof rail 72, as described in more detail below, controls movement of folding mechanism 32 and, thus, serves as a driving link for folding mechanism 32. Movement of rear roof rail 72 relative to vehicle 22 is controlled by a powered driving element or actuator 112. Powered actuator 112 can take a variety of forms, as known in the art. For example, powered actuator 112 can be an electric motor, a fluid actuated piston, a geared driving element, or a cable, among others. Thus, movement of folding mechanism 32 between the raised and stowed positions is controlled by powered actuator 112 via rear roof rail 72. Alternatively, folding mechanism 32 can be manually driven.

Referring now to FIG. 1A, folding mechanism 32 is shown in its fully raised position corresponding to roof cover 34 covering the passenger compartment 24 and storage compartment 26 of vehicle 22. When in the raised position, front roof rail 48, center roof rail 50 and rear roof rail 72 are all generally aligned and first roof bow 42, second roof bow 66, third roof bow 84, fourth roof bow 88, and frame 38 are fully extended so that roof cover 34 is taut and backlite 36 is substantially vertical. A backlite is considered to be substantially vertical when the angle a between the backlite and a vertical axis 114 is less than about 35 degrees. That is, a substantially vertical backlite is angled relative to a vertical axis 114 in the range of about 0 to 35 degrees in either direction toward horizontal.

When convertible roof 20 is to be retracted, first roof bow 42 is unlatched from the front header and A-pillar 56 of vehicle 22, as is known in the art, and powered actuator 112 begins to cause rear roof rail 72 to rotate about pivot 82 in a clockwise direction when folding mechanism 32 is viewed from the perspective shown in the figures.

As can be seen in FIGS. 2A–B, as folding mechanism 32 moves from the raised position toward the stowed position, the clockwise rotation of rear roof rail 72 causes second control link 96 to move to the right and frame 38 to begin rotating forwardly about pivot 94. Additionally, the clockwise rotation of rear roof rail 72 causes balance link 76 to rotate clockwise about pivot 80 and center roof rail 50 to move rearwardly and rotate counterclockwise relative to rear roof rail 72 and balance link 76. Clockwise rotation of rear roof rail 72 also causes first control link 68 to move rearwardly which causes MHA 52 to rotate front roof rail 48 clockwise relative to center roof rail 50. As actuator 112 continues to rotate rear roof rail 72 clockwise about pivot 82, frame 38 and backlite 36 continue to rotate forwardly and enter storage compartment 26 first. Actuator 112 continues to drive rear roof rail 72 clockwise about pivot 82 until frame 38 is completely within storage compartment 26 and the remainder of folding mechanism 22 is positioned above frame 38, as shown in FIG. 3A.

As stated above, movement of each of the roof bows 42, 66, 84, and 88 are actively controlled. Actively controlling the roof bows 42, 66, 84, and 88 prevents the roof bows 42, 66, 84 and 88 from interfering with frame 38 and backlite 36 when folding mechanism 22 is moved from the raised position to the stowed position. Additionally, actively controlling the roof bows 42, 66, 84, and 88 allows folding mechanism 22 to be packaged within close tolerances and, thus, folding mechanism 22 can occupy a smaller space in storage compartment 26.

When convertible roof 20 is in the fully stowed position, vehicle 22 has substantially nothing above a fore-aft beltline 114 from A-pillar 46 rearward to the back of vehicle 22. This configuration of convertible roof 20 provides a novel and unique appearance for vehicle 22, in that it can give the appearance of a station wagon or SUV with the convertible roof 20 in the fully raised position while providing a top down motoring experience of a convertible vehicle with convertible roof 20 in the stowed position. The station wagon or SUV appearance is characterized as having an interior with passenger compartment 24 having first seating area 28 positioned in front of second seating area 30 and storage compartment 26 positioned behind passenger compartment 24 with storage compartment 26 being accessible from the interior of vehicle 22 and, more specifically, from passenger compartment 24 along with having backlite 36 substantially vertical.

Referring now to FIG. 3, folding mechanism 32 is shown in its fully stowed position which corresponds to being located within storage compartment 26. As can be seen, folding mechanism 32 folds in an accordion-type fashion so that folding mechanism 32 folds and stacks upon itself with frame 38 located in a bottommost position of storage compartment 26.

When convertible roof 20 is moved from its stowed position to its raised position, folding mechanism 32 operates in a reverse fashion. Actuator 112 is operated to cause rear roof rail 72 to rotate about pivot 82 in a counterclockwise direction. The counterclockwise rotation of rear roof rail 72 causes first control link 68 and center roof rail 50 to move forwardly and center roof rail 50 to rotate clockwise relative to rear roof rail 72 and balance link 76. The forwardly movement of first control link 68 causes MHA 52 to rotate front roof rail 48 counterclockwise relative to center roof rail 50., Rotation of rear roof rail 72 counterclockwise also causes second control link 96 to move upwardly and forwardly which causes frame 38 to move upwardly and rotate clockwise about pivot 94. The movement of folding mechanism 32 causes roof cover 34 to expand and begin to unfold along with folding mechanism 32. When folding mechanism 32 reaches its fully raised position, roof cover 34 is taut and front edge 44 of first roof bow 42 can be latched to the front header of vehicle 22 above the front windshield. The active controlling of the roof bows 42, 66, 84 and 88 position the bows in a desired orientation so that roof cover 34 is taut and provides a desired appearance.

Figure 4D:
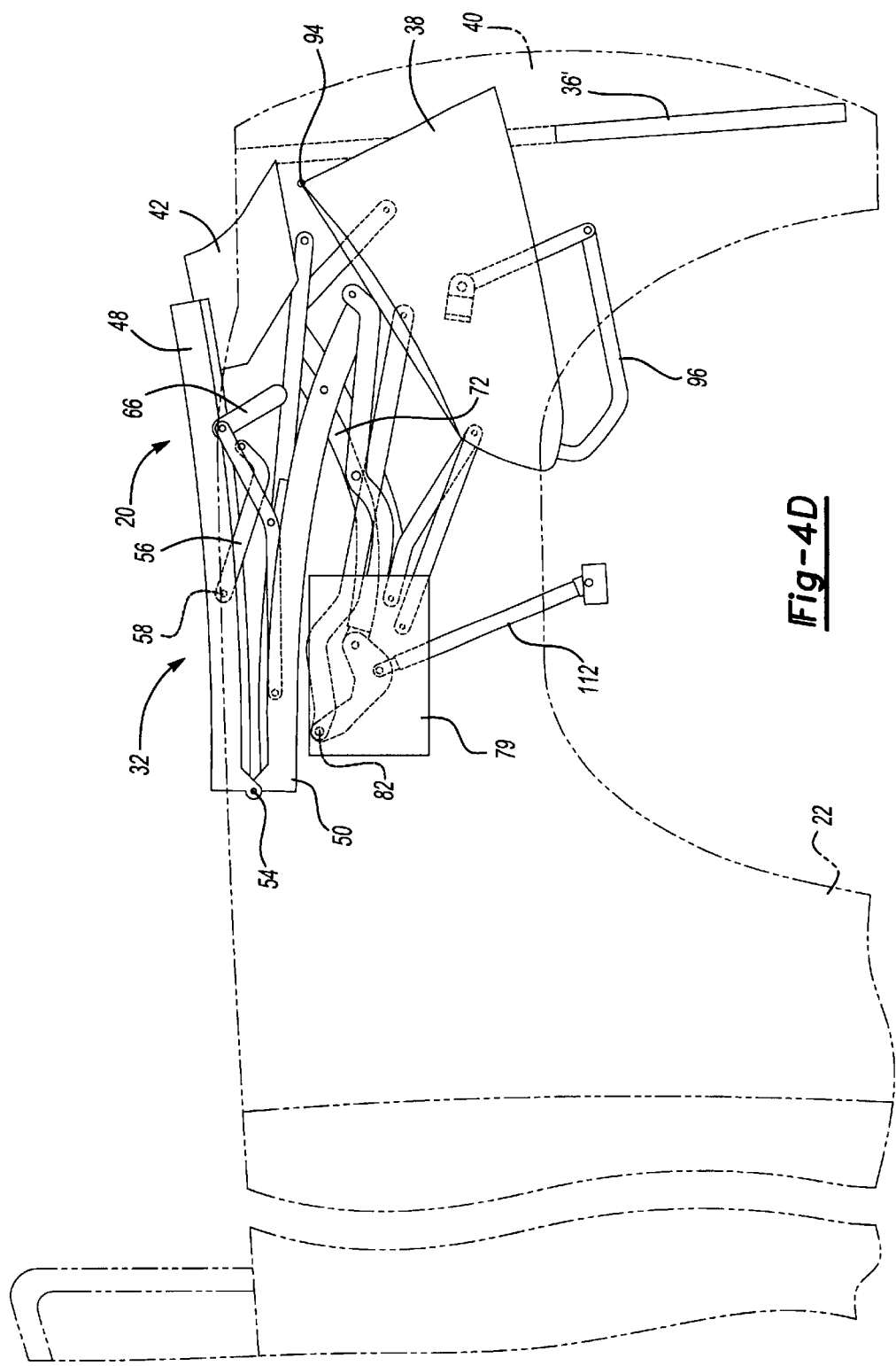
FIG. 4D is a side elevation view of the vehicle of FIG. 4A showing the convertible roof folding mechanism in accordance with the principles of the present invention in a stowed position and the backlite in a retracted position.

Referring now to FIGS. 4A–D, an alternate preferred embodiment of convertible roof 20 is shown. In this embodiment, as was mentioned above, convertible roof 20 employs a backlite 36' that is independently retractable from folding mechanism 32. Specifically, backlite 36' moves between an extended position, wherein backlite 36' is retained in frame 38, as shown in FIG. 4A, and a retracted position wherein backlite 36' is retained in tailgate 40, as shown in FIGS. 4B–D. When backlite 36' is in the extended position, frame 38 engages with and retains three sides of backlite 36'. When backlite 36' is in its retracted position, frame 38 is not engaged with backlite 36' and is free to move with folding mechanism 32 without moving backlite 36'. Retraction of backlite 36', can be accomplished in a variety of ways, as is known in the art. For example, backlite 36' can be connected to a track roller system with nylon rollers, similar to a glass guide on a door glass mechanism, that moves backlite 36' between the extended and retracted positions. By allowing backlite 36' to be retracted when convertible roof 20 is in its fully raised position, access to storage compartment 26 can be achieved from outside vehicle 22 through the opening in frame 38 when backlite 36' is in its retracted position in tailgate 40.

When retracting a convertible roof 20 that has a backlite 36' that is retractable independently of folding mechanism 32, operation of convertible roof 20 to move from a fully raised position to a fully stowed position is slightly different. Specifically, before convertible roof 20 can be moved from its fully raised position to its fully stowed position, backlite 36' is retracted into tailgate 40. Once backlite 36' is retracted into tailgate 40 and is no longer retained by frame 38, actuator 112 can be operated to cause rear roof rail 72 to rotate clockwise about pivot 82 and cause folding mechanism 32 to retract into its fully stowed position, as described previously. When it is desired to return convertible roof 20 to its fully raised position, actuator 112 causes rear roof rail 72 to rotate clockwise about pivot 82 to unfold and extend folding mechanism 32 across passenger compartment 24 and storage compartment 26. Once folding mechanism 32 has been completely unfolded, backlite 36' can then be extended into frame 38 to complete the enclosure of passenger compartment 24 and storage compartment 26 with convertible roof 20.

Thus, the present invention provides a unique and novel convertible roof 20 for use with a vehicle 22. The present invention provides for a convertible roof 20 having roof bows that are all actively controlled, a frame 38 for retaining a backlite 36, 36' that is actively controlled and falls first into storage compartment 26 and resides below the roof rails and roof bows of folding mechanism 32 when in the stowed position. The present invention also provides a clean look for a vehicle 22 by having substantially nothing above beltline 116 from A-pillar 46 back when convertible roof 20 is in its stowed position. Additionally, folding mechanism 32 including frame 36 can be powered by the same actuator 112.

While various aspects of convertible roof 20 and folding mechanism 32 have been disclosed, it will be appreciated that many other variations may be employed without departing from the scope of the present invention. For example, MHA 52 may have more links than a 4-bar linkage. Additionally, the specific connections of the various pivots can be altered to provide desired kinematics of convertible roof 20. Furthermore, the specific configurations and orientations of the various linkages, bows and rails can have shapes that differ from those shown and still be within the scope of the present invention. The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A convertible roof system for an automotive vehicle, said system comprising:
   (a) a roof cover;
   (b) a backwindow moveable between extended and retracted positions mechanically independent of said roof cover; and
   (c) a folding mechanism supporting at least a portion of said cover, said mechanism being moveable between a stowed position and a raised position, said mechanism comprising:
      a frame configured to retain a portion of said backwindow and moving with said mechanism when said mechanism moves from said raised position to said stowed position, said frame extending along and retaining said portion of said backwindow when said backwindow is in said extended position and being disengaged from said backwindow when said backwindow is in said retracted position.

2. The system of claim 1, wherein said backwindow is substantially vertical when said backwindow is in said extended position.

3. The system of claim 1, wherein said frame pivots forwardly when said mechanism moves from said raised position to said stowed position.

4. The system of claim 1, wherein a portion of said roof cover is covered by a pliable material.

5. The system of claim 1, wherein said frame is configured to retain portions of at least three sides of said backwindow.

6. The system of claim 1, wherein said mechanism further comprises an automatically powered actuator operable to selectively move said mechanism between said raised and stowed positions, and said mechanism includes a set of cross-car extending roof bows.

7. The system of claim 1, wherein said backwindow is substantially co-planar with a substantially vertical rear panel of said vehicle when said backwindow is in a functional position.

8. The system of claim 1, wherein said backwindow is substantially rigid.

9. A convertible roof system for an automotive vehicle, said system comprising:
   (a) a roof cover;
   (b) a backwindow independently moveable between extended and retracted positions; and
   (c) a folding mechanism supporting at least a portion of said cover, said mechanism being moveable between a stowed position and a raised position, said mechanism comprising:
      (i) a plurality of pairs of roof rails; and
      (ii) a frame pivoting with movement of said mechanism, said frame being configured to retain a portion of said backwindow when said backwindow is in said extended position and disengaged from said backwindow when said backwindow is in said retracted position, and said frame being coupled to a first pair of said plurality of pairs of roof rails so that movement of said frame is controlled by said first pair of roof rails.

10. The system of claim 9, wherein said mechanism further comprises a powered actuator coupled to said first pair of roof rails and operable to selectively move said mechanism between said stowed and raised positions.

11. The system of claim 9, wherein said first pair of roof rails is a rearwardmost pair of roof rails.

12. The system of claim 9, wherein said backwindow is substantially vertical when retained in said frame.

13. The system of claim 9, wherein said frame pivots forwardly when said mechanism moves from said raised position to said stowed position.

14. The system of claim 9, wherein movement of a roof bow immediately forward of said frame is actively controlled.

15. A convertible roof system for an automotive vehicle, said system comprising:
 (a) a roof cover having a soft top portion; and
 (b) a folding mechanism supporting at least a portion of said cover, said mechanism being moveable between a stowed position and a raised position, said mechanism comprising:
  (i) an automatically powered actuator operable to selectively move said folding mechanism between said stowed and raised positions; and
  (ii) a backwindow frame moving with movement of said mechanism, said frame being configured to retain a portion of a backwindow in a substantially vertical orientation between about 35 degrees forward and about 10 degrees rearward of vertical when said mechanism is in said raised position.

16. The system of claim 15, wherein said mechanism further comprises:
 (iii) a plurality of pairs of roof rails;
 (iv) a plurality of roof bows extending transversely between said pairs of roof rails; and wherein movement of a first roof bow of said plurality of roof bows immediately forward of said frame is actively controlled.

17. The system of claim 15, wherein each of said plurality of roof bows is actively controlled.

18. The system of claim 15, wherein said frame is coupled to said powered actuator so that movement of said frame is actively controlled by said powered actuator.

19. The system of claim 18, wherein said mechanism further comprises a pair of roof rails that are connected to and driven by said powered actuator and said frame is coupled to said pair of roof rails so that movement of said frame is controlled by said powered actuator via said pair of roof rails.

20. The system of claim 15, wherein said frame moves pivotally.

21. The system of claim 15, wherein said frame pivots forwardly when said mechanism moves from said raised to said stowed position.

22. The system of claim 15, further comprising a rigid backlite independently moveable between extended and retracted positions, a portion of said backlite being retained in said frame when said backlite is in said extended position and said backlite being disengaged from said frame when in said retracted position.

23. A convertible roof system for an automotive vehicle, said system comprising:
 (a) a roof cover having a soft top portion; and
 (b) a top stack assembly supporting at least a portion of said cover, said top stack assembly being moveable between a stowed position and a raised position, said top stack assembly comprising:
  (i) a powered actuator operable to selectively move said top stack assembly between said stowed and raised positions;
  (ii) a first linkage assembly operably controlling movement of a portion of said top stack assembly and said first linkage assembly being driven by said powered actuator;
  (iii) a frame operably moving pivotally with said top stack assembly, said frame being configured to retain a portion of a backwindow when said top stack assembly is in said raised position; and
  (iv) a second linkage assembly operably controlling movement of said frame and being driven by said powered actuator.

24. The system of claim 23, wherein said second linkage assembly is connected to said first linkage assembly so that said second linkage assembly is driven by said powered actuator via said first linkage assembly.

25. The system of claim 24, wherein said first linkage assembly comprises a plurality of pairs of roof rails and a plurality of roof bows extending transversely between said pairs of roof rails, and wherein said second linkage assembly is connected to a first pair of said pairs of roof rails so that said second linkage assembly is driven by said powered actuator via said first pair of roof rails.

26. The system of claim 25, wherein said first pair of roof rails is a rearwardmost pair of roof rails of said plurality of pairs of roof rails.

27. The system of claim 23, wherein said frame pivots forwardly when said top stack assembly moves from said raised position to said stowed position.

28. The system of claim 23, wherein said frame retains a backwindow substantially vertically when said folding mechanism is in said raised position.

29. The system of claim 23, wherein said frame retracts into a stowage compartment first when said top stack assembly moves from said raised position to said stowed position.

30. The system of claim 23, wherein movement of a roof bow immediately forward of said frame is actively controlled by said first linkage assembly.

31. A convertible roof system for an automotive vehicle having, said system comprising:
 (a) a roof cover;
 (b) first and second roof rail sets moveable between a stowed position and a raised position;
 (c) a plurality of roof bows extending transversely between said roof rail sets;
 (d) an automated actuator operable to selectively move said roof rail sets between said stowed and raised positions; and
 (e) a backwindow frame coupled to and operably driven by said actuator and operably retracting prior to and residing below said roof rail sets and said roof bows when said roof rail sets are moved from said raised position to said stowed position.

32. The system of claim 31, wherein said frame pivotally retracts.

33. The system of claim 32, wherein said frame pivots forwardly when said mechanism moves from said raised position to said stowed position.

34. The system of claim 31, wherein a first roof bow of said plurality of roof bows immediately forward of said frame is actively controlled.

35. The system of claim 34, wherein each roof bow of said plurality of roof bows is actively controlled.

36. The system of claim 31, wherein said actuator is connected to and drives said first roof rail set and said frame is coupled to said first roof rail set so that said frame is driven by said actuator via said first roof rail set.

37. The system of claim 31, wherein said frame retains a backwindow substantially vertically when said roof rail sets are in said raised position.

38. The system of claim 31, further comprising a rigid backwindow independently moveable between extended and retracted positions, a portion of said backwindow being retained in said frame when said backwindow is in said extended position and said backwindow being disengaged from said frame when in said retracted position.

39. A convertible roof system for an automotive vehicle, said system comprising:
(a) a roof cover having a soft portion; and
(b) a folding mechanism supporting at least a portion of said cover, said mechanism being moveable between a stowed position and a raised position, said mechanism comprising:
(i) an automatically powered actuator operable to selectively move said mechanism between said stowed and raised positions;
(ii) a backwindow frame configured to retain a portion of a backwindow, said frame being coupled to and driven by said powered actuator and moving pivotally when said mechanism moves between said raised and said stowed positions;
(iii) a plurality of pairs of roof rails; and
(iv) at least four roof bows extending transversely between said pairs of roof rails, and
wherein a first roof bow of said roof bows immediately forward of said frame is actively controlled.

40. The system of claim 39, wherein each of said roof bows is actively controlled.

41. The system of claim 39, wherein said frame pivots forwardly when said mechanism moves from said raised position to said stowed position.

42. The system of claim 39, wherein said powered actuator is connected to and drives a rearwardmost pair of roof rails of said plurality of pairs of roof rails and said frame is coupled to said rearwardmost pair of roof rails so that said frame is driven by said powered actuator via said rearwardmost pair of roof rails.

43. The system of claim 39, wherein said frame retains a backwindow substantially vertically when said mechanism is in said raised position.

44. The system of claim 39, further comprising a substantially rigid backwindow moveable independently of said mechanism between extended and retracted positions, a portion of said backwindow being retained in said frame when said backwindow is in said extended position and said backwindow being disengaged from said frame when in said retracted position.

45. A convertible roof system for an automotive vehicle, said system comprising:
(a) a roof cover having a soft portion; and
(b) a folding mechanism supporting at least a portion of said cover, said mechanism being moveable between a stowed position and a raised position, said mechanism comprising:
(i) a backwindow;
(ii) at least one pair of roof rails;
(iii) at least one roof bow extending transversely between said at least one pair of roof rails; and
(iv) a frame retaining a portion of at least three sides of said backwindow such that said frame and backwindow move in unison, said frame and said backwindow pivotally retracting into a stowage compartment when said mechanism is moved from said raised position to said stowed position.

46. The system of claim 45, wherein said mechanism further comprises an automatically powered actuator operable to selectively move said mechanism between said stowed and raised positions, and wherein said frame is coupled to and driven by said powered actuator.

47. The system of claim 46, wherein said powered actuator is connected to and drives a rearwardmost pair of roof rails and said frame is coupled to said rearwardmost pair of roof rails so that said frame is driven by said powered actuator via said rearwardmost pair of roof rails.

48. The system of claim 45, wherein said frame is a roof bow.

49. The system of claim 45, wherein said frame and said backwindow retract into said stowage compartment prior to and reside below said at least one pair of roof rails and said at least one roof bow when said mechanism is in said stowed position.

50. The system of claim 45, wherein said frame pivots forward when said mechanism moves from said raised position to said stowed position.

51. The system of claim 45, wherein said backwindow is substantially vertical when said mechanism is in said raised position.

52. The system of claim 45, wherein a roof bow immediately forward of said frame is actively controlled.

53. An automotive vehicle comprising:
(a) a passenger compartment having fore and aft seating areas, each of said seating areas being substantially forward facing;
(b) a storage compartment positioned aft of said passenger compartment and accessible from said passenger compartment;
(c) an A-pillar; and
(d) a convertible top comprising:
(i) a roof cover; and
(ii) a folding mechanism supporting at least a portion of said cover, said mechanism being moveable between a raised position wherein said roof cover covers said passenger and storage compartments and a stowed position wherein said convertible top is stowed in said storage compartment, said convertible top being configured so that no convertible top or vehicle body structure extends substantially above a fore-aft extending belt-line of the vehicle rearward of said A-pillar when said mechanism is in said stowed position.

54. The vehicle of claim 53, wherein said storage compartment extends from said passenger compartment to a rear end of the vehicle.

55. The vehicle of claim 53, wherein said convertible top includes a substantially rigid backwindow that is substantially vertical when said mechanism is in said raised position.

56. The vehicle of claim 53, wherein said mechanism further comprises an automatically powered actuator operable to move said mechanism between said raised and stowed positions.

57. The vehicle of claim 53, wherein said mechanism further comprises a plurality of pairs of roof rails and a plurality of roof bows extending transversely between said pairs of roof rails.

58. The vehicle of claim 53, wherein said mechanism further comprises a backwindow frame configured to retain a portion of a backwindow when said mechanism is in said raised position.

59. The vehicle of claim 53, wherein said convertible top further comprises a backwindow that is moveable between retracted and extended positions independent of said mechanism.

60. The vehicle of claim 53, wherein at least a portion of said roof cover is pliable.

61. The vehicle of claim 60, wherein a majority of said roof cover is pliable.

* * * * *

UNITED STATES PATENT AND TRADEMARK OFFICE
CERTIFICATE OF CORRECTION

PATENT NO. : 6,659,533 B1
DATED : December 9, 2003
INVENTOR(S) : Todd A. Grubbs

It is certified that error appears in the above-identified patent and that said Letters Patent is hereby corrected as shown below:

Column 3,
Line 38, "FIG." should be -- FIGS. --.
Line 54, "FIGS 1-3" should be -- FIGS. 1-4 --.

Column 5,
Line 22, "aide" should be -- aid --.
Line 55, "a" should be -- ∝ --.

Column 6,
Line 30, "114" should be -- 116 --.
Line 60, "fowardly" should be -- forward --.
Line 62, "50.," should be -- 50 --.

Signed and Sealed this

Seventh Day of September, 2004

JON W. DUDAS
*Director of the United States Patent and Trademark Office*